US011965645B2

(12) United States Patent
Filipponi

(10) Patent No.: US 11,965,645 B2
(45) Date of Patent: Apr. 23, 2024

(54) LUMINAIRE WITH LED LIGHTS PROVIDED WITH HEAT SINK

(71) Applicant: Giuliano Filipponi, Recanati (IT)

(72) Inventor: Giuliano Filipponi, Recanati (IT)

( * ) Notice: Subject to any disclaimer, the term of this patent is extended or adjusted under 35 U.S.C. 154(b) by 0 days.

(21) Appl. No.: 18/311,677

(22) Filed: May 3, 2023

(65) Prior Publication Data

US 2023/0358393 A1 Nov. 9, 2023

(30) Foreign Application Priority Data

May 6, 2022 (IT) ........................ 102022000009320

(51) Int. Cl.

| | |
|---|---|
| ***F21V 29/70*** | (2015.01) |
| ***F21V 15/01*** | (2006.01) |
| ***F21V 17/12*** | (2006.01) |
| ***F21V 23/06*** | (2006.01) |
| ***F21V 31/00*** | (2006.01) |
| ***F21Y 115/10*** | (2016.01) |

(52) U.S. Cl.

CPC .............. *F21V 29/70* (2015.01); *F21V 15/01* (2013.01); *F21V 17/12* (2013.01); *F21V 23/06* (2013.01); *F21V 31/005* (2013.01); *F21Y 2115/10* (2016.08)

(58) Field of Classification Search

CPC .......... F21V 29/70; F21V 15/01; F21V 17/12; F21V 23/06; F21V 31/005; F21Y 2115/10

See application file for complete search history.

(56) References Cited

U.S. PATENT DOCUMENTS

2007/0159815 A1* 7/2007 Bayat .................... F21V 7/0075 362/157

* cited by examiner

*Primary Examiner* — Mary Ellen Bowman

(74) *Attorney, Agent, or Firm* — Egbert, McDaniel & Swartz, PLLC

(57) ABSTRACT

A luminaire having an inner body, a tubular frame mounted on the inner body, a connector mounted in the inner body, an illuminating device connected to the connector, and a heat sink attached to the inner body and in thermal contact with the illuminating device and the tubular frame.

15 Claims, 4 Drawing Sheets

A
B
100
1
1a
1b
2
3
4
5
6
7
8
10
11
12
24
71
91
92
B1
B2
C
F1
G1
G2
M
V1
V2

LUMINAIRE WITH LED LIGHTS PROVIDED WITH HEAT SINK

CROSS-REFERENCE TO RELATED APPLICATIONS

Not applicable.

BACKGROUND OF THE INVENTION

1. Field of the Invention

The present invention relates to a luminaire with LED lights provided with a heat sink.

2. Description of Related Art

Including Information Disclosed Under 37 CFR 1.97 and 37 CFR 1.98.

As it is well known, the current luminaires using LEDs comprise integrated circuits associated with LEDs in order to power LEDs. Although satisfactory from a practical point of view, such a technology proves to be very problematic when a luminaire stops working due to a failure or malfunction of the printed circuit.

Indeed, in such an eventuality, the end user would be unable to restore the luminaire because of the impossibility to replace the printed circuit that has stopped functioning properly. Therefore, the user would have no choice but to send the failing luminaire to the technical service provided by qualified personnel, thus being unable to use the luminaire for a period time and having to bear the inevitable costs of such a qualified technical service.

It was precisely a careful consideration of such a deficient prior art that resulted in designing the new technology according to the invention, which enables to brilliantly overcome the drawbacks of the past.

It is the purpose of the present invention to make a luminaire using an LED illuminating device that can be easily replaced by the end user since the LED illuminating device is no longer connected to a printed circuit board, and at the same time it protects the LED illuminating device from overheating hazards that could impair its integrity and operation.

A further purpose of the present invention is to give the luminaire a structure that is resistant to the possible infiltration of water that might occur during any outdoor use.

Another purpose of the present invention is to provide the luminaire with the ability to alternately accommodate LED illuminating devices of different sizes.

BRIEF SUMMARY OF THE INVENTION

These purposes are achieved in accordance with the invention with the luminaire defined in the independent claim 1.

Further solutions of such a luminaire are covered in the dependent claims.

In order to prevent the overheating of the LED illuminating device, the LED illuminating device is arranged inside the luminaire in an aluminum housing that performs the typical function of a heat sink. The dissipation of the heat produced by the illuminating device occurs thanks to the contact of the illuminating device with the surface of the aluminum housing.

The illuminating device is easily replaceable as it is provided with a GU10 socket that is readily available on the aftermarket, unlike the LEDs associated with a respective printed circuit.

In addition, illuminating devices of different sizes can be mounted in the luminaire due to the provision of a compensating spring that operates at the height of the engagement point of the electrical pins of the illuminating device.

BRIEF DESCRIPTION OF THE SEVERAL VIEWS OF THE DRAWINGS

For the sake of explanatory clarity, the description of the invention continues with reference to the attached drawings, which are for illustrative and non-limiting purposes only, wherein.

DETAILED DESCRIPTION OF THE INVENTION

Figures 1, 2, 3:
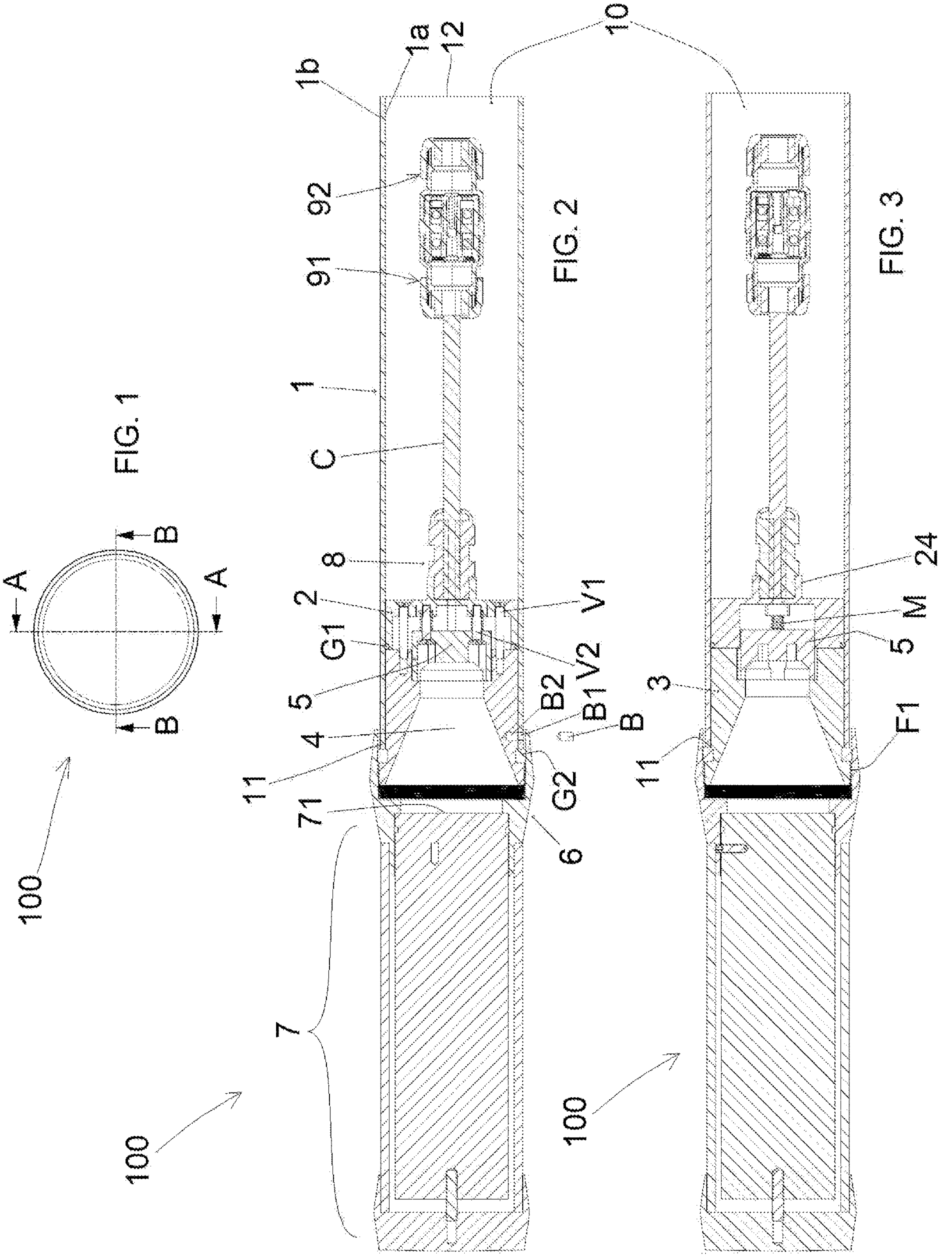
FIG. 1 is a plan view of the luminaire according to the invention.
FIG. 2 is an axial sectional view of the luminaire according to the invention sectioned according to the A-A plane of FIG. 1.
FIG. 3 is an axial sectional view of the luminaire according to the invention sectioned according to the B-B plane of FIG. 1.
Figure 4:
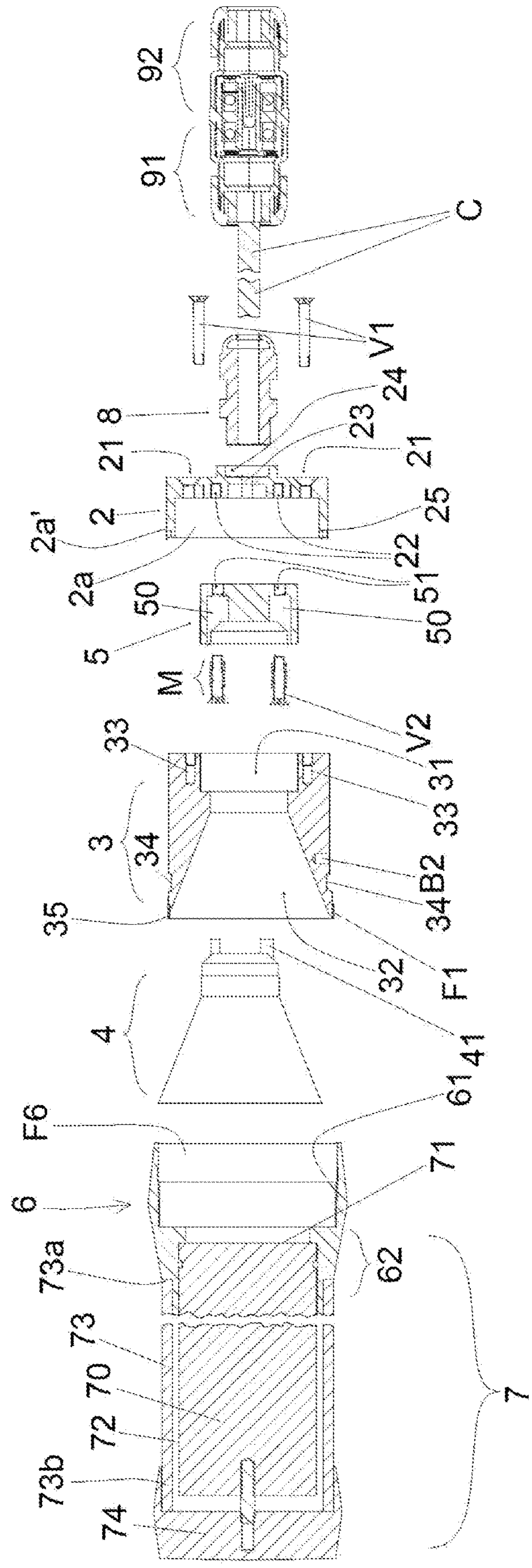
FIG. 4 is an exploded axial sectional view of the various parts of the luminaire according to the invention.
Figure 5:
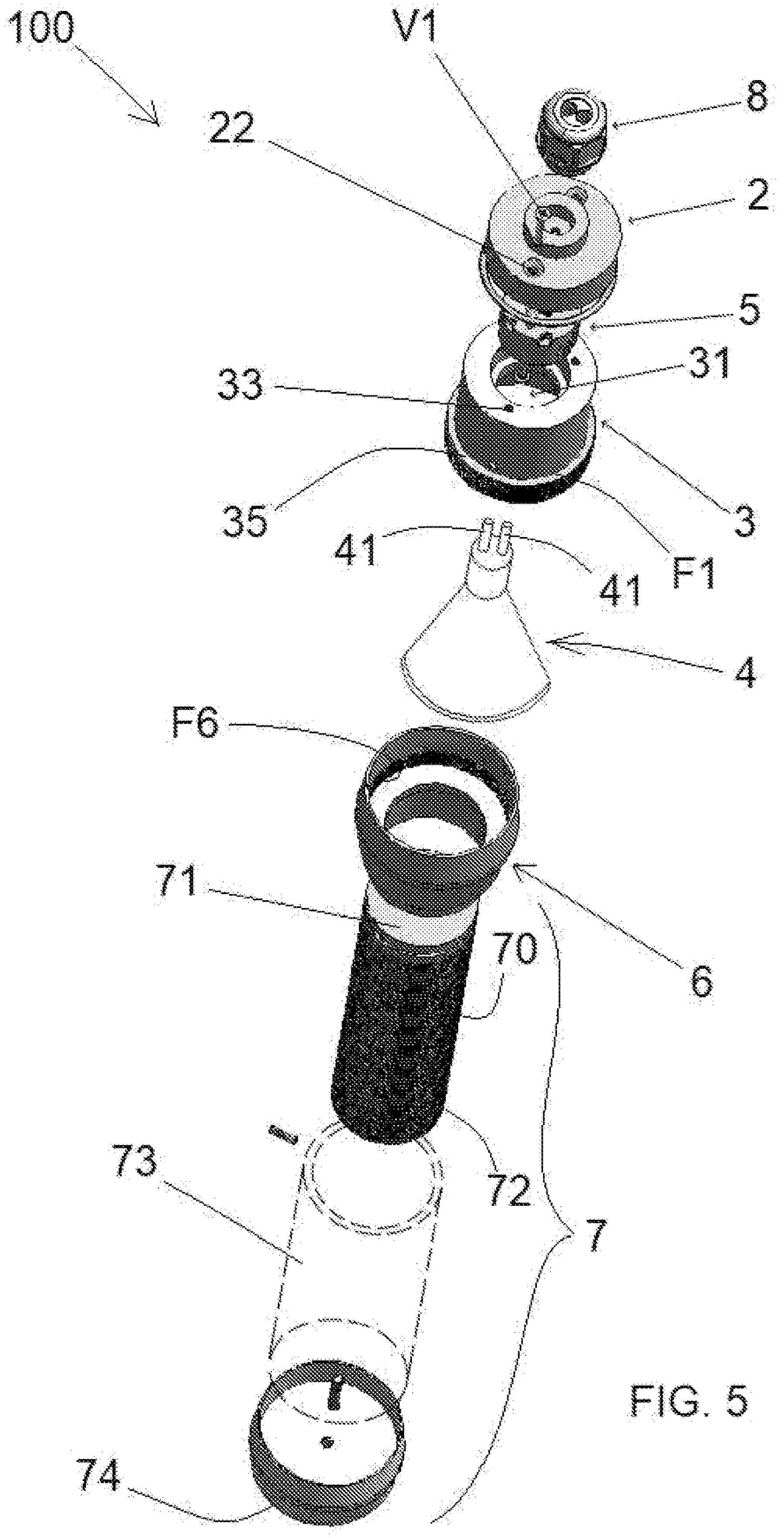
FIG. 5 is an exploded axonometric view of the luminaire.

With reference to the Figures, the luminaire (or lighting fixture) according to the invention is described, which is comprehensively indicated with reference numeral 100.

The luminaire (100) is especially designed to be used as a spotlight for outdoor use (gardens or parks), however, the luminaire (100) is also suitable for indoor use.

The luminaire (100) comprises:

an inner body (2), a tubular frame (1) mounted on the inner body (2), a connector (5) mounted in the inner body (2), an illuminating device (4) connected to the connector (5), and a heat sink (3) fixed to the inner body (2) and in thermal contact with the illuminating device (4) and the tubular frame (1).

The tubular frame (1) has a cylindrical shape, comprising an inner surface (1*a*), an outer surface (1*b*) and a cavity (10) defined by the inner surface (1*a*). The tubular frame (1) extends from a first end (11), or front end, to a second end (12), or rear end.

The inner body (2) has a circular shape in plan view, basically a cup-like shape. The inner body (2) is housed in the cavity (10) of the tubular frame (1). The inner body (2) has a concave face (2*a*) circumscribed by a perimeter edge (2*a*') facing the first end (11) of the tubular frame (1).

The connector (5) has electrical contacts (50) and a circular shape in plan view. The connector (5) is disposed in the concave face (2*a*) of the inner body (2) and is movably connected to the inner body by means of connecting means (V2), such as screws (V2), crossing through holes (51) of the connector (5) in order to be screwed into respective threaded holes (22) of the inner body (2). In this way, the connector (5) can slide over the screws (V2).

The heat sink (3) has a cylindrical shape, and is preferably made of aluminum. The heat sink (3) is arranged in the cavity (10) of the tubular frame (1). The heat sink (3) is arranged against the perimeter edge (2*a*') of the inner body (2). The heat sink (3) has a first seat (31) with circular shape, in which the connector (5) is inserted, and a second seat (32) of substantially truncated-conical shape, communicating with the first seat (31) and facing the first end (11) of the tubular frame (1).

The illuminating device (4) is preferably a GU10 LED lamp. The illuminating device (4) is arranged in contact inside the second seat (32) of the heat sink (3), and comprises electrical pins (41) suitable for contacting the corresponding electrical contacts (50) of the connector (5)

The luminaire (100) may comprise fixing means (V1, B) to lock the inner body (2) to the heat sink (3) and the inner body (2) or the heat sink (3) to the tubular frame (1).

The fixing means (V1, B) specifically comprise first fixing means (V1) that secure the heatsink (3) and the inner body (2). The first means (V1) comprise screws threaded into respective through holes (21) of the inner body (2) and screwed into threaded blind holes (33) of the heat sink (3) at peripheral positions with respect to the first seat (31) of the heat sink.

In addition, the fixing means comprise second means (B) that allow the assembly formed by the heat sink (3) with the inner body (2) to be attached to the tubular frame (1).

The second fixing means (B) comprise a locking pin threaded into a through hole (B1) obtained laterally on the tubular frame (1) and screwed into a threaded hole (B2) obtained on the heat sink (3).

Figure 6:
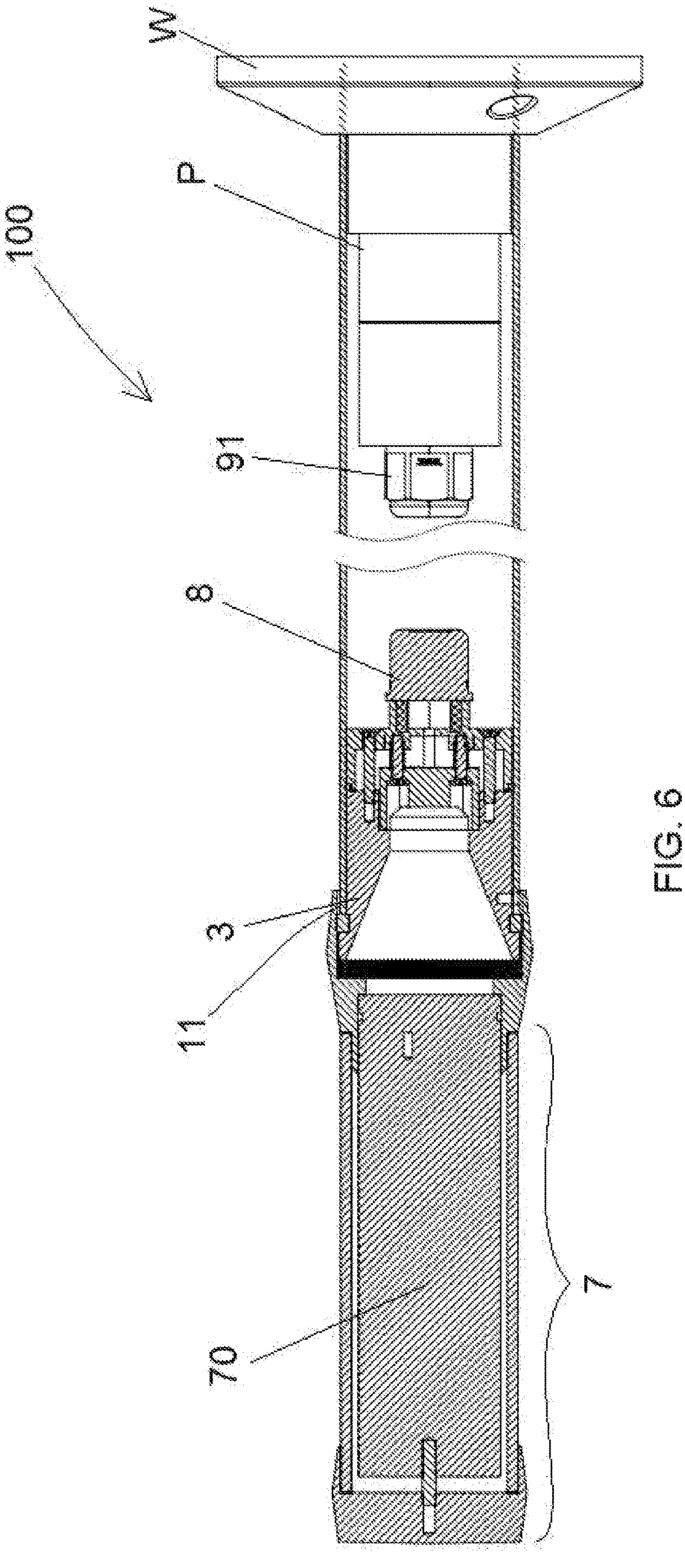
FIG. 6 is a sectional view of the luminaire according to the invention, with the additional provision of a wall-mounting boss connected to the tubular frame of the luminaire.

Referring to FIGS. 2, 3, and 6, the heat sink (3) has a protruding annular edge (35) suitable for abutting against the first end (11) of the tubular frame (1).

To ensure an effective insulation of the internal components (especially the electrical pins (41) and electrical contacts (50)) of the luminaire (100) against possible water infiltration, a first annular gasket (G1) engaged in a perimeter shoulder (25) of the perimeter edge (2*a*') of the inner body (2) is provided. The first annular gasket (G1) is suitable for being compressed between the inner surface (1*a*) of the tubular frame (1), the perimeter edge (2*a*') of the inner body (2), and the heat sink (3).

The luminaire (100) comprises an optical diffuser (7) of the light with a substantially cylindrical shape suitable for being coupled to the first end (11) of the tubular frame (1), for the purpose of diffusing the light produced by the illuminating device (4).

The optical diffuser (7), which is preferably made of methacrylate, comprises a first surface (71) suitable for being radiated by the light emitted by the illuminating device (4) and a second surface (72) that radially diffuses the light into the surrounding space.

The optical diffuser (7) has a metal ring (6) having an internal thread (F6). The internal thread (F6) of the metal ring (6) is screwed with an external thread (F1) made on the outside of the heat sink (3). The threads (F1, F6) act as connection means for connecting the optical diffuser (7) with the heat sink (3).

In an alternative embodiment of the invention the thread can be obtained on the outside of the tubular frame (1), and not on the heat sink (3). In such a case the threads (F1, F6) act as connection means of the diffuser with the tubular frame (1).

The luminaire (100) includes a sealing and insulating means between the optical diffuser (7) and the heat sink (3) and/or the tubular frame (1). Such a sealing means comprises a second annular gasket (G2) engaged inside an annular seat (34) provided on the outside of the heat sink (3), between the thread (F1) of the heat sink and the tubular frame (1). In this way, the second gasket (G2) is compressed between the heat sink (3), the first end (11) of the tubular frame (1) and the ring nut (6) of the optical diffuser (7).

The luminaire (100) also comprises compensation means (M) suitable for adjusting the mutual position between the inner body (2) and the electrical connector (5). The compensation means (M) comprise one or more elastic elements interposed between the inner body (2) and the connector (5), for the purpose of enabling the connector (5) to alternately assume a position of greater or lesser proximity with respect to the concave face (2*a*) of the inner body (2), depending on the length of the various illuminating devices (4) arranged from time to time in the second seat (32) of the heat sink (3).

Said elastic elements of the compensation means (M) comprise two helical springs threaded into the screws (V2) in charge of connecting the connector (5) and the inner body (2). The springs (M) are intended to remain more or less compressed between the connector (5) and the inner body (2) precisely in function of the length of the illuminating device (4) mounted on the luminaire (100) from time to time.

With regard to the power supply of the luminaire (100), the inner body (2) is provided in the center of its concave face (2*a*) with a through hole (23) that ends in a circular seat (24) facing the second end (12) of the tubular frame (1). The circular seat (24) forms a fastening seat for a cable gland (8). The cable gland (8) houses an electric cable (C) housed inside the tubular frame (1). After crossing the through hole (23) of the inner body (2), the electrical cable (C), provides power to the electrical contacts (50) of the connector (5).

The tubular frame (1) also houses a male/female connector (9) associated with the electrical cable (C). The male/female connector (9) comprises a first element (91) connected with the end of the electrical cable (C), and a second element (92) suitable for being connected to an external power cable.

The optical diffuser (7) comprises a main body (70) made of methacrylate, comprising said first surface (71) and second surface (72), and a protective shell (73), made of methacrylate, mounted on the outside of said main body (70). The protective shell (73) has a first end (73*a*) coupled to said metal ring (6), and a second end (73*b*) coupled to a closure cap (74).

With reference to FIG. 6, the second end (12) of the tubular frame (1) of the luminaire (100) is preferably coupled to a boxed boss (W) provided with through holes that allow the passage of screws used to fix the luminaire (100) to the wall or to the ground.

A support (P) is arranged inside the cavity (10) of the tubular frame, is connected to the boxed boss (W) and is suitably shaped to support the male/female connector (9).

The tubular frame (1) is always shown with a circular section and thus as a hollow cylinder, however said tubular frame (1) may also have a different shape, such as a square or rectangular section. In such a case, the elements inside the tubular frame (1), such as the inner body (2) and the heat sink (3), will have a shape conforming to that of the tubular frame (1) that houses them.

Numerous variations and modifications may be made to the present embodiment of the invention, within the scope of a person skilled in the art, but within the scope of the invention expressed by the appended claims.

I claim:

1. A luminaire comprising:

an inner body having a cup-shaped surface with a concave face;

a tubular frame mounted on said inner body, said tubular frame having an inner surface and an outer surface and a cavity defined by the inner surface, said inner body being housed inside the cavity of said tubular frame;

a connector mounted in said inner body;

an illuminating device connected to said connector, said illuminating device having electrical pins; and a heat sink attached to said inner body, said heat sink being in thermal contact with said illuminating device and with said tubular frame, said heat sink being housed inside the cavity of said tubular frame and in contact with said inner body, said heat sink having a first seat facing said inner body and a second seat communicating with the first seat, said illuminating device being housed in the second seat of said heat sink, said connector being interposed between said illuminating device and said inner body, said connector being inserted into the first seat of said heat sink, said connector having electrical contacts adapted to accommodate the electrical pins of said illuminating device.

2. The luminaire of claim 1, further comprising:

a fixing means that for fixing said inner body to said heat sink and for fixing said inner body or said heat sink to said tubular frame.

3. The luminaire of claim 1, further comprising:

a first gasket disposed inside the cavity of said tubular frame so as to insulate the electrical pins and the electrical contacts from a water infiltration.

4. The luminaire of claim 2, wherein said fixing means comprises:

a first fixing means securing said heat sink and said inner body to each other, said first fixing means comprising screws threaded into respective through holes of said inner body and screwed into threaded blind holes of said heat sink at positions peripheral to the first seat of said heat sink; and a second fixing means securing an assembly formed by said heat sink with said inner body to said tubular frame, said second fixing means comprising a locking pin positioned into a through hole formed laterally on said tubular frame and screwed into a threaded hole of heat sink.

5. The luminaire of claim 1, further comprising:

a connection means for connecting said inner body to said connector.

6. The luminaire of claim 5, wherein said connection means comprises screws crossing through holes of said connector and screwed into respective threaded holes of said inner body.

7. The luminaire of claim 1, further comprising:

compensating means for adjusting a position between said inner body and said connector.

8. The luminaire of claim 7, wherein said compensating means comprises at least one elastic element interposed between said inner body and said connector.

9. The luminaire of claim 6, further comprising:

compensating means for adjusting a position between said inner body and said connector, wherein said compensating means comprises at least one elastic element, the at least one elastic element being a helical spring respectively threaded on an exterior of the screws of said connection means.

10. The luminaire of claim 3, wherein said first gasket is compressed between at least two of said inner body, said heat sink and said tubular frame.

11. The luminaire of claim 1, wherein said illuminating device is a GU10 LED lamp.

12. The luminaire of claim 1, wherein said heat sink is of an alumina material.

13. The luminaire of claim 1, further comprising:

an optical diffuser having a first surface adapted to be radiated by light emitted from said illuminating device and a second surface adapted to transmit the light; and a connection means for connecting said optical diffuser to said tubular frame or for connecting said optical diffuser to said heat sink.

14. The luminaire of claim 13, wherein said connection means comprises:

an external thread formed on an exterior of said heat sink; and an internal thread formed on an interior of a metal ring of said optical diffuser, said internal thread of the metal ring being screwed onto said external thread of said heat sink.

15. The luminaire of claim 14, further comprising:

an annular seat formed on said heat sink, said annular seat interposed between said external thread of said heat sink and said tubular frame; and an annular gasket disposed on an exterior of said tubular frame, said annular gasket inserted into said annular seat and compressible between said heat sink and the metal ring and said tubular frame.

* * * * *